United States Patent [19]

Kupczik

[11] Patent Number: 4,588,310
[45] Date of Patent: May 13, 1986

[54] BEARING ARRANGEMENT TO BE SUBMERGED IN WATER OR A SLURRY

[76] Inventor: Günter Kupczik, Wittenbergener Weg 18, 2000 Hamburg 56, Fed. Rep. of Germany

[21] Appl. No.: 620,104

[22] Filed: Jun. 13, 1984

[30] Foreign Application Priority Data

Jun. 15, 1983 [DE] Fed. Rep. of Germany ....... 3321593

[51] Int. Cl.⁴ .......................... F16C 33/74; E03F 9/00
[52] U.S. Cl. ...................... 384/152; 277/25; 277/68
[58] Field of Search ............... 384/129, 130, 131, 132, 384/144, 135, 152, 153, 477, 489, 478, 480; 277/13, 14 R, 14 V, 25, 67, 68, 69

[56] References Cited

U.S. PATENT DOCUMENTS

| | | | |
|---|---|---|---|
| 3,552,809 | 1/1971 | Owens | 384/482 |
| 3,897,120 | 7/1975 | Riegler et al. | 384/558 X |
| 4,152,032 | 5/1979 | Pierpoline et al. | 384/131 |
| 4,392,752 | 7/1983 | Shimizu et al. | 384/135 |

FOREIGN PATENT DOCUMENTS

| | | |
|---|---|---|
| 2228757 | 2/1973 | Fed. Rep. of Germany . |
| 2610974 | 9/1976 | Fed. Rep. of Germany . |
| 2215470 | 8/1974 | France . |
| 840166 | 7/1960 | United Kingdom . |
| 1556880 | 11/1979 | United Kingdom . |

OTHER PUBLICATIONS

Technical Magazine for Practical Metal Working, 60 (1966) Issue 4, pp. 5 to 7.

Primary Examiner—Stuart S. Levy
Assistant Examiner—David Werner
Attorney, Agent, or Firm—Toren, McGeady, Stanger, Goldberg & Kiel

[57] ABSTRACT

A bearing assembly comprises an outer bearing housing and at least one inner bearing element, which serves for rotatably mounting a component. The bearing assembly is intended to be submerged in water or in a slurry and defines outwardly open gaps, which are inclined to the axis of the bearing arrangement and disposed at the ends of the bearing element and axially and radially outwardly of the bearing element. The gaps are defined between relatively rotatable parts of the bearing assembly. Each gap contains at least one sealing ring at a distance from the outer end of the gap. Lubricating means are provided in each shaft beside the sealing ring.

17 Claims, 4 Drawing Figures

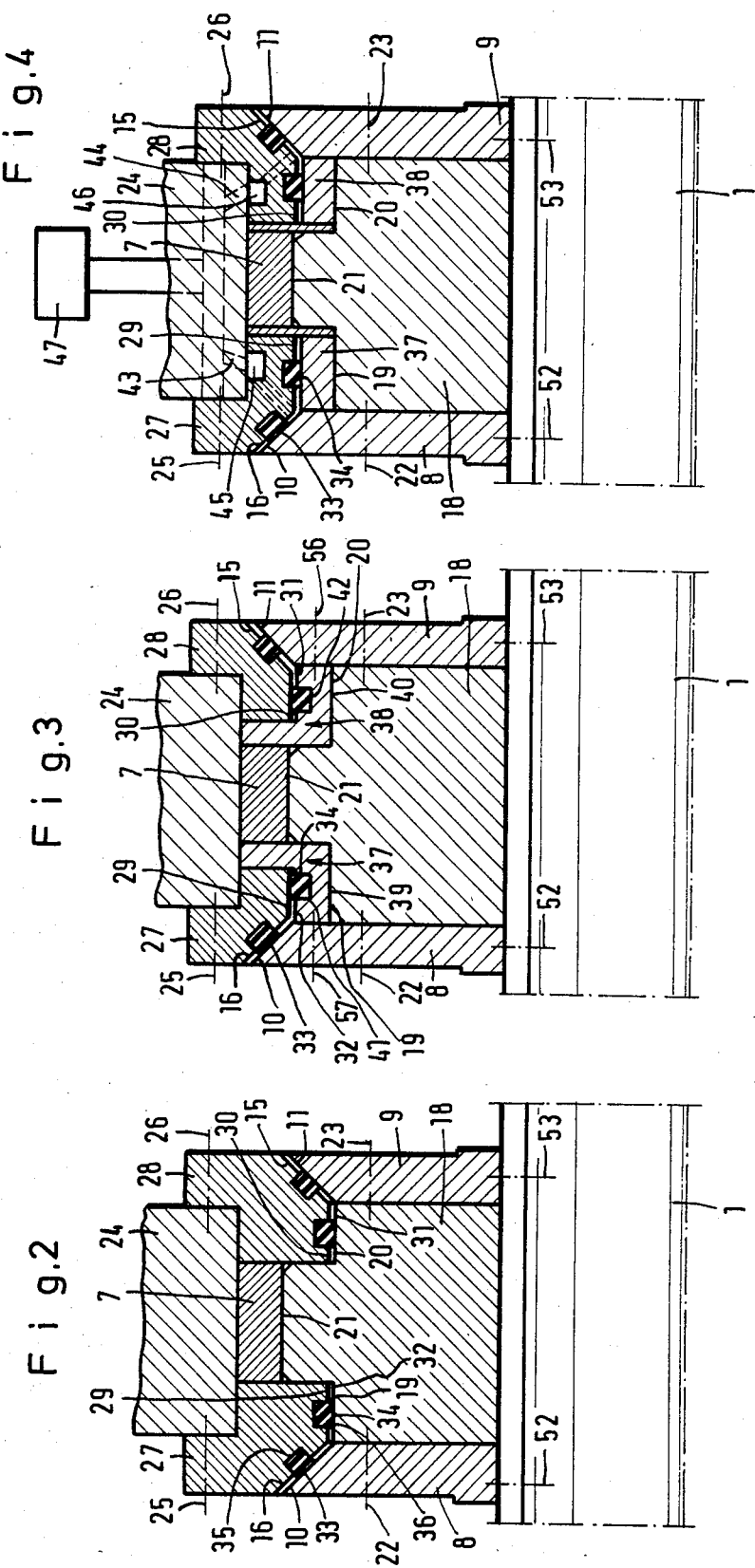

BEARING ARRANGEMENT TO BE SUBMERGED IN WATER OR A SLURRY

BACKGROUND OF THE INVENTION

This invention relates to a bearing assembly comprising a bearing housing and an inner bearing element for mounting a component, and means defining outwardly open gaps which are disposed radially and axially outwardly of the bearing element and extend at an acute angle to the axis of the bearing.

A known bearing assembly of the above type comprises a rotating sealing disc, which covers an annular gap between the inner and outer races of a rolling element bearing. The axial distance between the sealing disc and the rolling element bearing should be such that the sealing disc defines a conical surface, and a cooperating member is provided, which has a conical surface that faces the conical surface of the sealing disc and is slightly spaced therefrom. In that arrangement the annular gap is continued in a radial plane and has a cylindrical end portion. When the known seal for a rolling element bearing is submerged in a slurry, the pollutants enter particularly spaces which are defined by a radial plane and finally also the cylindrical portion so that the seal is eliminated during operation.

A bearing assembly used to mount a rotating shaft and submerged in water or in a slurry is subjected to special conditions and considerable loads during operation. Particularly during prolonged operation under such conditions or during operation in stiff mud, e.g., in the cleaning of a sewer pipe, it will be difficult to maintain the seals under constant conditions of rotational motion.

It is also known to provide seals, particularly so-called rotary shaft seals, for protecting carrying bearings against an ingress of water.

It is also known to use so-called labyrinth glands, oil chamber seals and the like for sealing a gap between relatively movable parts against an ingress of a surrounding fluid. In such arrangements the sealing surfaces extend at right angles to the axis of the shaft.

The at least one inner bearing may comprise a sliding surface bearing or a rolling element bearing, such as a roller bearing or ball bearing, or a different bearing. Under the operating conditions referred to hereinbefore, such bearings are subjected to considerable loads, and the known embodiments include extremely complicated seals.

The shaft mentioned hereinbefore as a component consists in a preferred embodiment of a horizontal shaft in a machine. The shaft carries a bearing, on which a movable component may be mounted. Within the scope of the invention a virtually stationary bearing for a rotating shaft is also included.

In a suitable known embodiment said bearing may consist of a driving element which is similar to an eccentric disc. In that case the component consists of a member which is mounted on and movable relative to said driving element. It is known to provide at least one bearing bushing, which is mounted on the bearing or driving element and disposed between the parts which guide in each other.

An advantageous illustrative example for the use of such bearing is disclosed in Laid-open German Application No. 32 39 756 which discloses apparatus for cleaning a sewer pipe. In that case a horizontal drive shaft is moved through a slurry consisting of water and impurities. That shaft drives eccentric discs for moving reciprocating elements, which in that known embodiment consist of milling blades.

SUMMARY OF THE INVENTION

It is an object of the invention to improve a bearing assembly of the kind described first hereinbefore in such a manner that an ingress of impurities will be substantially prevented with simple means even during operation under adverse conditions.

Another object is to provide a bearing assembly which when submerged in water or in a slurry will remain in an operative condition even when it is at an standstill.

In accordance with the invention these and other objects are accomplished by the provision of a bearing assembly which comprises at least one inner bearing element for mounting a component and which also comprises a bearing housing surrounding the inner bearing element, wherein the bearing element and the bearing housing are rotatable relative to each other and outwardly open gaps extending at right angles to the axis of the bearing are provided on the outside of the bearing assembly between the parts which are rotatable relative to each other. During a rotation of one of the parts consisting of said component and the outer bearing housing those confronting surface portions which define said gaps are moved relative to each other, each gap contains at least one sealing ring, which is spaced from the outer end of the gap, and each gap also contains lubricant beside the sealing ring.

In a preferred embodiment, cover discs are provided at opposite ends of the bearing element and are non-rotatably connected to the component, retaining rings are connected to opposite ends of the bearing housing, said cover discs have rims which face the retaining rings and extend away from the axis of the bearing assembly at an oblique angle to said axis, said rims are spaced from parallel rims provided on the retaining rings, and the outwardly open gaps, which are inclined to the axis of the bearing arrangement, are defined by the confronting rims of the cover discs and of the retaining rings.

In such an embodiment the centrifugal force exerted by one surface portion during a rotation thereof gives rise to forces acting in the gap which is inclined to the axis of the shaft and relatively heavy particles suspended in the water are thrown out of the gaps under the action of said forces. When particles thus thrown off impinge on that gap-defining wall which is opposite to the rotating or driving member, said particles will be reflected toward the exit of the gap. The pressure which is thus set up in the gap will prevent an ingress of impurities. The at least one sealing ring which is spaced from the outer end constitutes a surface for collecting the material which is to be thrown off, and the gap which is inclined to the axis of the shaft is closed at a distance from its open ends by said at least one sealing ring. The lubricant constitutes an additional sealing medium, which ensures that the bearing assembly will remain operative also during a standstill. The lubricant may consist of an accumulation of lubricant, and such accumulation may be held in a gap between two sealing rings.

In a desirable embodiment the one conical gap is continued at its inner end by a gap portion which is parallel to the axis of the bearing arrangement and surrounds the bearing element, and said gap portion also contains at least one second sealing ring. The provision of lubricant in the gap between the two sealing rings is preferred, so that said additional sealing medium is preferably provided only in part of the gap.

The retaining rings are preferably formed with lubricating passages for lubricating the gaps. Said lubricating passages are provided with lubricating chambers and are fed from a lubricating system.

In another desirable embodiment the bearing element consists of a first bearing bushing and is adjoined at opposite ends by two L-shaped bearing bushings, which have flanges that extend parallel to the axis of the bearing assembly and constitute surface portions that define correspondingly extending gap portions. That arrangement will contribute to a simple design.

A simple arrangement in accordance with the invention will be obtained if the at least one bearing bushing is adjoined at opposite ends by the retaining rings, which define a gap portion which is inclined to the axis of the shaft and a gap portion which extends parallel to the axis of the shaft. That arrangement may also be used with existing bearings to obtain the advantages afforded by the invention.

A gap portion which is parallel to the shaft will also give rise to turbulence in the fluid contained in said shaft and will prevent a deposition of solids from such fluid. The gaps extending at an acute angle to the axis of the shaft will prevent an ingress of solid particles.

The gaps have preferably a width on the order of 1 mm. This dimension has also proved desirable in the cleaning of sewer pipes. Larger particles cannot enter such gaps in any case and even particles which are smaller in diameter will be thrown off by the resulting centrifugal force.

Such an embodiment may be used to advantage with vertical or horizontal shafts. In the preferred embodiment, horizontal shafts will carry a bearing element on which a component is rotatably mounted.

The invention will now be described with reference to illustrative embodiments which are shown on the drawings, in which

BRIEF DESCRIPTION OF THE DRAWING

FIG. 2 is a fragmentary sectional view showing a part of an eccentric bearing,

FIG. 3 is a view that is similar to FIG. 2 and shows a different embodiment and

FIG. 4 is a view that is similar to FIG. 2 and shows a different eccentric bearing.

DETAILED DESCRIPTION OF THE INVENTION

Figure 1:
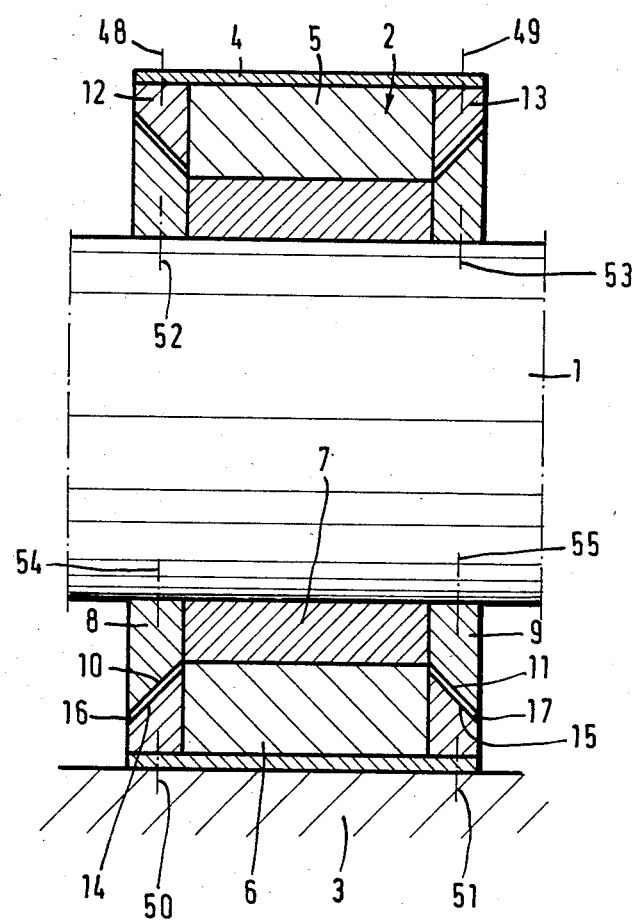
FIG. 1 is a sectional view showing a shaft bearing.

In all figures of the drawings, like parts are designated with like reference characters. The means for driving the shaft 1 are not shown.

A bearing 2 for the shaft 1 is shown in FIG. 1 and carried by a support 3. Specifically, the support 3 carries a bearing housing 4, which may consist in usual manner of two semimonocoques, which are forced against each other. The support 3 contains bearing shell sections 5, 6, in which a bearing bushing 7 secured to the shaft 1 is rotatably mounted.

Cover discs 8, 9 are non-rotatably connected to the shaft at opposite ends of the bearing bushing 7 and have outer rims 10, 11, which are inclined to the axis of the shaft 1 and extend radially and axially outwardly from the bearing bushing 7.

Retaining rings 12, 13 are secured to the bearing shell sections 5, 6 and the bearing housing 4 and have an inner rim or surface portion 14, 15 each, which is parallel to the adjacent outer rim 10, 11 so that inclined gaps 16, 17 are defined, which extend radially and axially outwardly from the bearing bushing 7.

Fasteners 48 to 51 are provided between the retaining rings 12, 13 and the bearing housing 4. Fasteners 52 to 55 are provided between the cover discs 8, 9 and the component 1, which consists of a shaft. Said fasteners may consist of set screws or of bands, which are adapted to be tightened. The fasteners 52, 53 are shown also in FIGS. 2 to 4.

It will be understood that fasteners 22, 23 may also be provided if required.

The rims 10, 11 which rotate with the shaft 1 create a swirl by which entering particles are entrained and are subsequently thrown off when they have impinged on the surface portions 14, 15. The particles are thus deflected outwardly toward the outlets of the gaps 16, 17 so that those particles which have entered and which are not inherently thrown out of the outlet openings of the gaps by centrifugal force will be deflected to said outlet openings.

FIG. 1 shows a particularly simple bearing assembly for a shaft. This bearing assembly may also be provided with additional elements, such as sealing rings, which will be described with reference to the succeeding figures.

In the preferred embodiment shown in FIGS. 2 to 4, a driving element 18 which is similar to an eccentric disc is non-rotatably connected to the shaft 1. The driving element 18 is provided at its outer periphery with shoulders 19, 20, and the actual bearing surface 21 of the eccentric disc is disposed between said shoulders and surrounded by a bearing bushing 7. It will be understood that said bearing bushing may be replaced by a different bearing element, such as a rolling element bearing.

In accordance with FIGS. 2 to 4 the cover discs 8, 9 are non-rotatably secured to the driving element, e.g., by screws 22, 23, if the driving element is to rotate with the shaft. Those rims 10, 11 of the cover discs which face away from the shaft extend at an angle of 45° to the axis of the shaft 1.

A component that is driven by the eccentric disc is mounted on the bearing bushing 7 or other bearing elements. The component 24 is shown only in part and constitutes at least one ring that surrounds the eccentric disc and is reciprocated in response to a rotation of the eccentric disc. Retaining rings 27, 28, which correspond to the retaining rings 12, 13 in FIG. 1, are secured to said component 24 by screws 25, 26 or by other suitable fasteners.

In view of the dimensions of the bearing bushing 7 or corresponding bearing means the retaining rings 27, 28 are so dimensioned that surface portions 15, 16 which are inclined to the shaft 1 extend parallel to the rims 10, 11 at a distance of about 1 mm. In the preferred embodiment the retaining rings 27, 28 have additional surface portions 29, 30, which are parallel to the shaft 1 and at the shoulders 19, 20 define a gap that is parallel to the shaft.

FIG. 2 shows a gap portion 31 that is inclined to the axis of the shaft 1 and a gap portion 32 that is parallel to the axis of the shaft 1. Each of the two gap portions 31, 32 contains a sealing ring 33 or 34, which is disposed in a chamber 35 or 36, which is formed in the retaining ring 27 or 28.

In the embodiment shown in FIGS. 2 and 3 a rotation of the shaft 1 will have the effect that fluid entering the gap portions which are inclined to the axis of the shaft will be thrown off under the resulting centrifugal force.

In accordance with FIG. 3, two L-shaped bearing bushings 37, 38, which are L-shaped in axial section are provided at opposite ends of the bearing bushing 7 and have flanges 39, 40, which are parallel to the shaft and define the gap portions 31, 32, which are parallel to the shaft. In the embodiment shown in FIG. 3 said flanges are formed with chambers 41, 42, which accommodate the sealing rings 34, which extend through those gap portions that are parallel to the shaft. In this embodiment the sealing rings 34 rotate with the shaft 1 and tend to propel the entering fluid. The L-shaped bearing bushings 37, 38 are secured, e.g., by fasteners 56, 57, to the parts which rotate with the shaft 1. In the present case they are shown to be fixed to the cover discs 8, 9.

The L-shaped bearing bushings 37, 38 shown in FIG. 4 differ from those shown in FIG. 3. In other respects the arrangement is similar. In the embodiment shown in FIG. 4 the gaps 31, 32 are connected to a lubricating system, which effects a lubrication particularly in those portions of the gaps 31, 32 which are disposed between the sealing rings 33, 34. Each of the sealing rings 33, 34 is disposed approximately in the middle of the length of a gap portion which is inclined to the axis of the shaft and approximately in the middle of a shaft portion which is parallel to the axis of the shaft, respectively.

In accordance with FIG. 4, lubricating passages 43, 44 communicate with the gaps and extend from lubricating chambers 45, 46, which are supplied from a lubricating system provided at or in the component 24. Pressure lubrication may be provided, if desired.

What is claimed is:

1. In a bearing assembly for mounting a component, comprising
    at least one inner axially extending bearing element centered around a predetermined axis and adapted to mount said component,
    a bearing housing surrounding said inner bearing element,
    said inner bearing element and bearing housing are mounted for relative rotation mutually,
    gap-defining means including inclined gap portions disposed between said inner bearing element and said outer bearing housing and inclined relative to said predetermined axis, each said inclined gap portion, extends axially and radially outwardly of said bearing element and has a radially outer end open to the outside of said bearing assembly,
    the improvement residing in that
    said gap-defining means comprise a pair of confronting surface portions which define therebetween one of said inclined gap portions, one of the surface portions of said pair being non-rotatable with regard to said bearing housing, the other surface portion of said pair being adapted to be non-rotatable with regard to said component,
    sealing ring means located in said gap-defining means and disposed in each said inclined gap portions and spaced from the radially outer end thereof, said sealing ring means affording a flow block across said inclined gap portions,
    said sealing ring means comprise two sealing rings spaced apart with one sealing ring located in said inclined gap portion, and
    an accumulation of lubricant for lubricating each said gap defining means between said two sealing rings.

2. In a bearing assembly for mounting a component, comprising
    at least one inner axially extending bearing element centered around a predetermined axis and adapted to mount said component,
    a bearing housing surrounding said inner bearing element,
    said inner bearing element and bearing housing are mounted for relative rotation mutually,
    gap-defining means including inclined gap portions disposed between said inner bearing element and said outer bearing housing and inclined relative to said predetermined axis, each said inclined gap portion, extends axially and radially outwardly of said bearing element and has a radially outer end open to the outside of said bearing assembly,
    the improvement residing in that
    said gap-defining means comprise a pair of confronting surface portions which define therebetween one of said inclined gap portions, one of the surface portions of said pair being non-rotatable with regard to said bearing housing, the other surface portion of said pair being adapted to be non-rotatable with regard to said component,
    sealing ring means located in said gap-defining means and disposed in each of said inclined gap portions and spaced from the radially outer end thereof, said sealing ring means affording a flow block across said inclined gap portions and
    lubricating means for lubricating each said inclined gap portion at said sealing ring means,
    two cover discs positioned at respective ends of said bearing element and adapted to be non-rotatably connected to said component,
    two retaining rings positioned at respective ends of said bearing housing,
    said cover discs are provided at their outer periphery extending generally in the axial direction of said bearing element with first rims inclined to said predetermined axis and extending radially and axially outwardly from said inner bearing element,
    said retaining rings are provided on the inner periphery thereof extending generally in the axial direction of said bearing element with second rims each disposed parallel to a respective one of said first rims,
    each of said first rims and the respective one of said second rims constitute said pair of confronting surface portions which define one of said inclined gap portions.

3. The improvement set forth in claim 2, wherein said sealing ring means located in said gap-defining means and disposed in each of said inclined gap portions comprises two sealing rings spaced apart with one said sealing ring located in said inclined gap portion, and
    said lubricating means are adapted to lubricate each of said gap-defining means between said two sealing rings.

4. The improvement set forth in claim 3, wherein said lubricating means comprise an accumulation of lubricant between said two sealing rings in said gap-defining means.

5. The improvement set forth in claim 2 wherein said lubricating means comprise lubricating passages formed in said bearing housing and in said retaining rings and each opening into one of said inclined gap portions.

6. The improvement set forth in claim 5, wherein said lubricating means comprise a source of lubricant, and means defining lubricating chambers connected between said source of lubricant and said lubricating passages.

7. The improvement set forth in claim 2, wherein
said bearing element comprises an axially extending first bearing bushing,
two additional bearing bushings L-shaped in axial section and each disposed at an opposite end of said first bearing bushing and adapted to be non-rotatably connected to said component,
each of said additional bearing bushings has a radially and an axially extending flange surrounding said first bearing bushing at the adjacent end thereof, and
each said retaining ring and a corresponding one of said axially extending flanges form a pair of additional confronting surface portions which define a parallel gap portion of said gap-defining means extending parallel to said predetermined axis.

8. The improvement set forth in claim 7, wherein
axially extending bearing shell sections are provided between said first bearing bushing and said bearing housing, and
said first bearing bushing is rotatably mounted in said bearing shell sections.

9. In a bearing assembly for mounting a component, comprising
at least one inner axially extending bearing element centered around a predetermined axis and adapted to mount said component,
a bearing housing surrounding said inner bearing element,
said inner bearing element and bearing housing are mounted for relative rotation mutually,
gap-defining means including inclined gap portions disposed between said inner bearing element and said outer bearing housing and inclined relative to said predetermined axis, each said inclined gap portion, extends axially and radially outwardly of said bearing element and has a radially outer end open to the outside of said bearing assembly,
the improvement residing in that
said gap-defining means comprise a pair of confronting surface portions which define therebetween one of said inclined gap portions, one of the surface portions of said pair being non-rotatable with regard to said bearing housing, the other surface portion of said pair being adapted to be non-rotatable with regard to said component,
sealing ring means located in said gap-defining means and disposed in each of said inclined gap portions and spaced from the radially outer end thereof, said sealing ring means affording a flow block across said inclined gap portions, and
lubricating means for lubricating each said inclined gap portion at said sealing ring means,
said gap-defining means comprise pairs of additional confronting surface portions defining parallel gap portions extending parallel to said predetermined axis, one of said additional surface portions of each of said pair thereof being non-rotatably connected to said bearing housing, the other said additional surface portion of each of said pair thereof being adapted to be non-rotatably connected to said component,
each of said parallel gap portions communicates with and extends axially inwardly from the radially inner end of one of said inclined gap portions and surrounds said inner bearing element, and
said sealing ring means are provided in each of said parallel gap portions at a distance from the axially outer end thereof.

10. The improvement set forth in claim 9, wherein said lubricating means are arranged for lubricating each of said parallel gap portions adjacent to said sealing ring means.

11. The improvement set forth in claim 10, wherein
said sealing ring means disposed in each of said inclined gap portions and the communicating parallel gap portion comprise two sealing rings spaced apart with one said sealing ring located in said inclined gap portion and the other said sealing ring located in said parallel gap portion
said lubricating means arranged to lubricate each of said inclined gap portions and parallel gap portions between said two sealing rings.

12. The improvement set forth in claim 11, wherein
said lubricating means comprise an accumulation of lubricant between said two sealing rings in each of said inclined gap portions and the communicating parallel gap portion.

13. The improvement set forth in claim 11, wherein
a cover disc provided at each respective end of said bearing element and adapted to be non-rotatably connected to said component,
a retaining ring connected to each respective end of said bearing housing,
each said cover disc and the respective one of said retaining rings comprise said pair of confronting surface portions which define one of said inclined gap portions,
each of said retaining rings forms one surface portion of each of said parallel gap portions,
said lubricating means comprise lubricating passages formed in said bearing housing and in said retaining rings and opening into said inclined gap portions, and into said parallel gap portions,
a source of lubricant, and
means defining lubricating chambers connected between said source of lubricant and said lubricating passages.

14. The improvement set forth in claim 9, wherein
said bearing element comprises an axially extending first bearing bushing,
two additional bearing bushings L-shaped in axial section and each disposed at an opposite end of said first bearing bushing and adapted to be non-rotatably connected to said component,
each of said additional bearing bushings has a radially and an axially extending flange surrounding said first bearing bushing at the adjacent end thereof, and
each said axially extending flange constitutes one surface portion of one of said confronting surface portions which define one said parallel gap portion.

15. The improvement set forth in claim 9, wherein said inclined and parallel gap portions each have a width of about 1 mm.

16. The improvement set forth in claim 1, wherein said inclined gap portions have a width of about 1 mm.

17. The improvement set forth in claim 1 as applied to a bearing assembly in which said inner bearing element and said outer housing are rotatable relative to each other about said predetermined axis.

* * * * *